United States Patent [19]
Khelifa et al.

[11] Patent Number: 5,725,639
[45] Date of Patent: Mar. 10, 1998

[54] DEVICE FOR DRYING AIR FOR MOTOR VEHICLES

[75] Inventors: Noureddine Khelifa, Stuttgart; Robert Hoeppler, Karlskron; Wolfgang Odebrecht, Sindelfingen, all of Germany

[73] Assignees: Bayerische Motoren Werke Aktiengesellschaft, Munich; Mercedes-Benz Aktiengesellschaft, Stuttgart, both of Germany

[21] Appl. No.: 686,749

[22] Filed: Jul. 26, 1996

[30] Foreign Application Priority Data

Jul. 28, 1995 [DE] Germany ............ 195 27 638.8

[51] Int. Cl.$^6$ .................. B01D 53/04; B01D 53/26
[52] U.S. Cl. ............... 96/112; 96/128; 96/130; 96/134; 96/140; 96/141; 96/144; 96/146; 55/385.3
[58] Field of Search ........ 55/385.3; 95/123–126; 96/108, 112, 121, 126–130, 133–136, 139–142, 144, 146

[56] References Cited

U.S. PATENT DOCUMENTS

| | | |
|---|---|---|
| 1,541,147 | 6/1925 | Ikeda et al. . |
| 2,248,225 | 7/1941 | Fonda ................... 96/111 |
| 2,257,478 | 9/1941 | Newton .............. 96/128 X |
| 2,519,296 | 8/1950 | Simpson ................ 96/126 |
| 2,621,899 | 12/1952 | Larson ............... 96/127 X |
| 2,712,981 | 9/1955 | Beggs ................ 95/124 X |
| 2,801,706 | 8/1957 | Asker ................ 96/130 X |
| 2,945,554 | 7/1960 | Berly ................. 96/142 X |

(List continued on next page.)

FOREIGN PATENT DOCUMENTS

| | | | |
|---|---|---|---|
| 2070098 | 11/1993 | Canada ................... 96/146 |
| 882 541 | 5/1953 | Germany . |
| 2050 898 | 4/1972 | Germany . |
| 23 47 335 | 4/1975 | Germany . |
| 30 00 078 | 7/1981 | Germany . |
| 36 26 887 | 2/1988 | Germany ................ 96/137 |
| 3626887 | 2/1988 | Germany ................ 96/127 |
| 43 04 077 | 8/1994 | Germany . |
| 44 08 796 | 9/1995 | Germany . |
| 44 08 796 A | 9/1995 | Germany . |
| 54-041276 | 4/1979 | Japan ................... 96/127 |
| 1211101 | 11/1970 | United Kingdom ........ 55/263 |

OTHER PUBLICATIONS

Entfeuchtung, "Welche Moglichkeiten Bietet Die Lufttechnik", HR 10/89, S.389–393.

Roben, "Aktueller Stand der Kontinuierlichen Luftenfeuchtung mit Festen Sporptionsmittlen", Luft–und Kaltetechnik 1992/1 S.22–28.

Heinrich, "Warmeruckgewinnung in Luftungstechnischen Anlagen", Verlag C.F. Muller, Heidelberg, 8/93 s. 62–65 & 188–189.

Reda, "Mikrofaserfilter zum Schutz der Fahrzeuginsassen", Atz Automobiltechnische Zeitschrift 92, 1990/3 s.148, 149, 152–154, 156.

*Primary Examiner*—Robert H. Spitzer
*Attorney, Agent, or Firm*—Foley & Lardner

[57] ABSTRACT

An air dehumidifier or drier, particularly for a motor vehicle, has an air guiding housing defining three parallel air flow paths, which are defined by a common main air chamber separating two laterally spaced apart secondary air chambers. A reactor containing an adsorbent is positioned between the secondary air chambers, the common main air chamber being defined between the reactors. Air-flow control elements are positioned in each of the main and secondary air chambers. The control elements are pivotal between two operating positions. In each position, one of the reactors is in adsorption operation (dehumidify air) while the other reactor is in desorption operation (reactor being dried or recharged). The desorption air directed to the reactor being dried is heated by a heat exchanger, which has an air passageway for exhausting the air used for drying the reactor. Thus, the desorption air directed to the reactor being dried is preheated using the energy from the exhausting air.

20 Claims, 4 Drawing Sheets

U.S. PATENT DOCUMENTS

| | | | |
|---|---|---|---|
| 3,009,684 | 11/1961 | Munters | 96/125 X |
| 3,092,477 | 6/1963 | Persson | 96/139 X |
| 3,263,400 | 8/1966 | Hoke et al. | 95/117 |
| 3,368,327 | 2/1968 | Munters et al. | 96/118 |
| 3,531,916 | 10/1970 | Kulperger et al. | 95/124 |
| 3,731,458 | 5/1973 | McGrath, Jr. | 95/123 |
| 3,827,218 | 8/1974 | Setlemyer | 55/179 |
| 3,844,737 | 10/1974 | Macriss et al. | 96/125 X |
| 4,012,206 | 3/1977 | Macriss et al. | 95/125 X |
| 4,530,817 | 7/1985 | Hölter et al. | 96/130 X |
| 5,076,821 | 12/1991 | Bruhnke et al. | 96/130 |
| 5,230,719 | 7/1993 | Berner et al. | 95/123 X |
| 5,327,739 | 7/1994 | Ingersoll et al. | 62/78 |
| 5,335,719 | 8/1994 | Khelifa et al. | 165/42 |
| 5,388,423 | 2/1995 | Khelifa | 62/238.3 |
| 5,435,150 | 7/1995 | Khelifa et al. | 62/271 |
| 5,474,594 | 12/1995 | Khelifa et al. | 95/14 |
| 5,500,038 | 3/1996 | Dauber et al. | 96/135 |
| 5,509,275 | 4/1996 | Bhatti et al. | 62/271 |
| 5,514,035 | 5/1996 | Denniston | 55/385.3 X |
| 5,556,028 | 9/1996 | Khelifa | 237/12.3 A |
| 5,566,880 | 10/1996 | Khelifa et al. | 237/12.3 A |
| 5,620,367 | 4/1997 | Khelifa | 96/127 X |

DEVICE FOR DRYING AIR FOR MOTOR VEHICLES

BACKGROUND OF THE INVENTION

Devices for drying or dehumidifying air in a vehicle passenger compartment are known. For example, German patent publication DE-A 20 50 898 discloses a device for drying air utilizing a flexible band, namely a fabric band impregnated with lithium chloride. A drive rotates the band so that air to be dehumidified continually flows through a regenerated band section. The regeneration takes place by guiding the band past a heating device. One problem with this type of drying device is that the salt solutions used therewith can corrode metals. Also, the salt can crystallize, which can lead to possible instability. Accordingly, either the desorption temperature or the salt concentration has to be controlled or continuously monitored. A heating device required for the desorption (drying) process also has to be extremely powerful to ensure adequate regeneration of the rapidly rotating band. Another drawback is that complete air drying is not possible with this type of device.

German patent publication DE-A 23 47 335 describes a ventilation device for an armored vehicle equipped with a dehumidifying device consisting of two dehumidifiers. Each dehumidifier is associated with a housing containing regeneratable moisture absorbing means. The two dehumidifiers are connected to air guiding pipes, one end receiving fresh air to be dehumidified and the other end exhausting hot regenerated air. A heating installation heats the regenerating air. Changeover devices in the air guiding pipes on both sides of the dehumidifying device connect the operating dehumidifier and have the moisture absorbing means in the ventilation flow, while the other dehumidifier loaded with moisture is simultaneously dried by air taken in from the heated ambient air. The known arrangement exclusively takes in fresh air from the ambient (outside), which air is dehumidified, filtered, and then exhausted from the interior of the armored vehicle into the ambient air. The regenerating air is always completely taken in from outside, thus necessitating enormous heating power at low outside temperatures to regenerate of the respective dehumidifier. For motor vehicles lacking capacity to generate an enormous amount of heat, this type of device cannot be used on energy efficiency grounds since the heat energy contained in the interior is released unused to the outside air and great heating power has to be available to heat the regeneration air.

In this respect, German patent application P 44 08 796.9 describes an air drying device for vehicle interiors, which device uses two parallel air flow paths formed in a housing. A reactor having an adsorbent is located in each of the air flow paths. With the aid of air-flow control elements for adjusting the air flows through the reactors, which are acted upon by an adsorption or desorption air flow during operation in the opposite sense and during the respective exchange.

There is a need for an energy efficient air drying device particularly in a motor vehicle. The present invention fulls this need.

SUMMARY OF THE INVENTION

The present invention is drawn to a device adapted for drying or dehumidifying air, particularly in a passenger compartment of a motor vehicle. According to one embodiment of the present invention, the air drying device has an air guiding housing defining at least two air flow paths. The guiding housing has an inlet for receiving inlet air to be dehumidified and an outlet for discharging dehumidified air, which outlet can be adapted to communicate with the passenger compartment using air ducts for example. Two reactors, each having an adsorbent for adsorbing moisture from air, are each positioned in one of the two air flow paths. A heat exchanger, which has an air passageway for exhausting air to the ambient, is provided upstream of the reactors to heat the inlet air (desorption) passing therethrough. Airflow control elements direct air to flow through both the reactors. According to the present invention, the flow control elements are positionable between adsorption operation or mode where the control elements direct the inlet air (adsorption) through each of the reactors and guide the inlet air (adsorption) passing through the reactor to dehumidify the inlet air (adsorption) and guide the dehumidified air to the outlet; and desorption operation or mode where the control elements guide the inlet air (desorption) passing through the reactor to dry the reactor and exhaust the inlet air (desorption) passing through the reactor through the passageway in the heat exchanger. One of the reactors dehumidifies the inlet air, while the other of the reactors is dried by the inlet air. The operation of these reactors can be selectively reversed.

In this respect, no two reactors are dried or dehumidify the inlet air at the same time. Thus, according to the present invention the flow control elements alternately direct the inlet air through each of reactors (first and second) between a first position and a second position. In the first position, the flow control elements guide the inlet air to pass through one of the reactors (the first reactor) to dehumidify the inlet air and guide the dehumidified air to the outlet, and guide the inlet air to pass through the other reactor (the second reactor) to dry the second reactor and exhaust air passing therethrough to the passageway in the heat exchanger. In the second position, the flow control elements guide the inlet air to pass through the second reactor to dehumidify the inlet air and guide the dehumidified air to the outlet, and guide the inlet air to pass through the first reactor to dry the first reactor and exhaust air passing therethrough to the passageway in the heat exchanger.

According to the invention, the heat exchanger is adapted to heat the inlet air passing through the heat exchanger by transferring heat from exhaust air passing through the heat exchanger passageway.

Preferably, the two air flow paths are parallel and defined by two secondary air chambers. The air guiding housing further includes a common main air chamber separating the two secondary air chambers. The two reactors define the common main air chamber. Each of the secondary air chambers is defined between one of the reactors and a wall of the air guiding housing. The air-flow control elements are positioned in the main air chamber and each of the secondary air chambers, and are selectively and alternately movable between the first position and the second position.

According to one embodiment of the present invention, the heat exchanger comprises a plurality of aligned parallel plates joined together by bonding corrugated ribs to the plates. The air-flow control elements comprise air-flow control flaps adapted to be pivoted by a common actuating device so that all of the flaps are pivoted simultaneously. The heat exchanger is preferably positioned transversely with respect to a longitudinal direction of the main air chamber and upstream thereof.

According to one embodiment of the present invention, the air guiding housing further includes an inlet chamber, the inlet leading to the inlet chamber. At least one air duct is formed in the inlet chamber for passage of the inlet air to be dehumidified, with the heat exchanger positioned in the inlet chamber so that part of the inlet air passing from the inlet chamber passes through the heat exchanger and travels into the main air chamber and through one of the reactors to be dried. Preferably, the air guiding housing has two air ducts upstream of the inlet chamber and the heat exchanger is positioned centrally between the two air ducts. Further, the air guiding housing includes an outlet chamber downstream of the two air flow paths or secondary air chambers, the outlet being at the outlet chamber.

Preferably, a replaceable air filter, such as an activated carbon filter, is positioned in the outlet chamber upstream of the air outlet. Instead of the air filter or in addition thereto, at least one replaceable particulate air filter can also be placed in the air guiding housing, upstream of the reactors. Preferably, the particulate air filter filters the entire volume of the air flow entering the air guiding housing through the inlet.

According to an embodiment of the present invention, a flat housing projection extends along one side of the air guiding housing. The flat housing projection and the air guiding housing form an exhaust air duct for exhausting air passing through the reactor to be dried through the heat exchanger. An intermediate wall separates the exhaust air duct from the main air chamber and the secondary air chambers. Openings are provided in the intermediate wall, which openings are manipulated with the air-flow control elements to alternately block one of the openings to bypass air to the outlet and guide one of the openings to permit air to exhaust therethrough.

Preferably, a heating device is positioned upstream of the reactors. The heating device can be a PTC heating installation or one that uses heat by passing an engine coolant. The heating device is preferably positioned between the heat exchanger and the main air chamber. In this respect, a temperature sensor for detecting the temperature of the inlet air passed through the reactor being dried and a control circuit can be provided for controlling the heating power of the heating device.

The inlet can communicate with the passenger compartment or the ambient or both using a fan with an air duct or ducts.

BRIEF DESCRIPTION OF THE DRAWINGS

These and other features, aspects, and advantages of the present invention will become more apparent from the following description, appended claims, and accompanying exemplary embodiments.

DETAILED DESCRIPTION OF THE PREFERRED EMBODIMENTS

Figure 1:
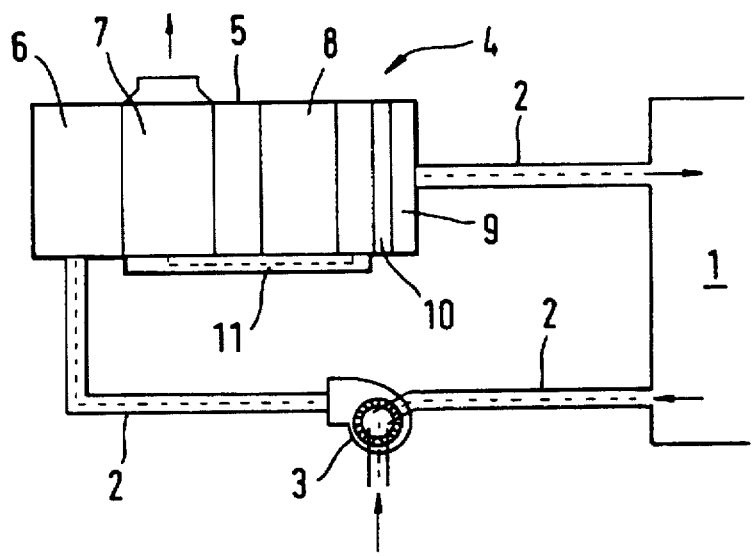
FIG. 1 shows a diagrammatic illustration of an air-circulating duct of a ventilation system with an air dehumidifier according to the present invention, particularly for a motor vehicle.

FIG. 1 shows a diagram of a ventilation system for a vehicle interior 1, including a fan 3 and an air drying or dehumidifying device 4 provided in an air guiding duct 2. The fan 3 can take in inlet air from the vehicle interior or passenger compartment 1 or fresh air from the ambient or both. The output side the fan 3 is connected to an inlet chamber 6 formed in a housing 5 via an inlet (not numbered). The air drying device 4 also includes a heat exchanger 7, which is designed as an air/air heat exchanger, as well as reactor means 8 containing an adsorbent, such as silica gel, zeolite or the like, for example. The heat exchanger thus has an exhaust air passageway for leading exhaust air through the ambient. Provided on the outgoing flow side of the reactor means 8 is an activated carbon filter 10 arranged in an outlet chamber 9 for filtering the dehumidified air fed to the vehicle interior via an outlet (not numbered). An air duct 11, through which the inlet air (exhaust) that has desorbed moisture from the reactor means 8 is guided from the reactor means 8 to the heat exchanger 7, is located on the housing 5. The air drying device 4 may, of course, also be combined with a heating or air-conditioning system of a motor vehicle.

Figure 2:
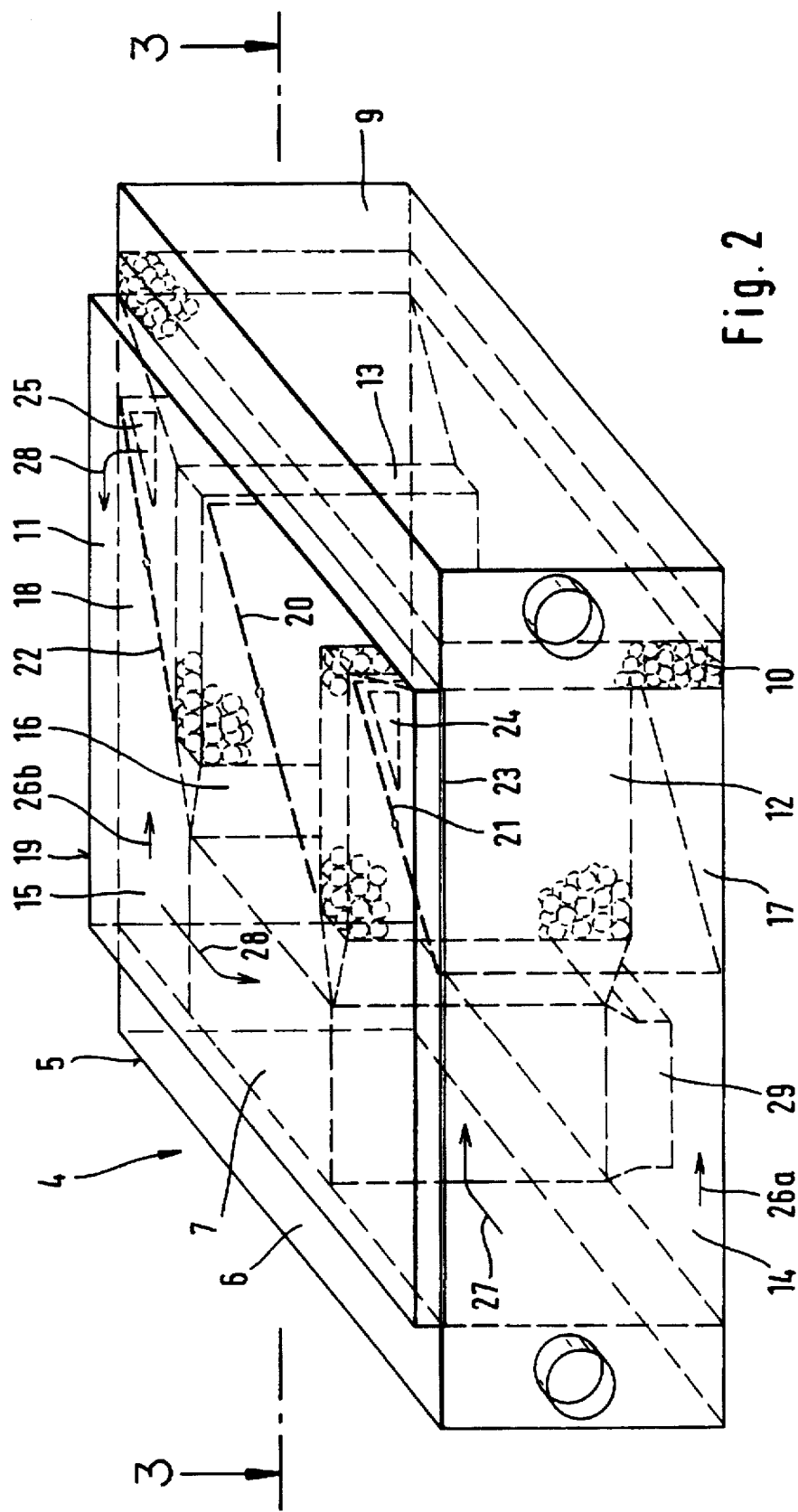
FIG. 2 shows a perspective view of an embodiment of the present invention.
Figure 3:
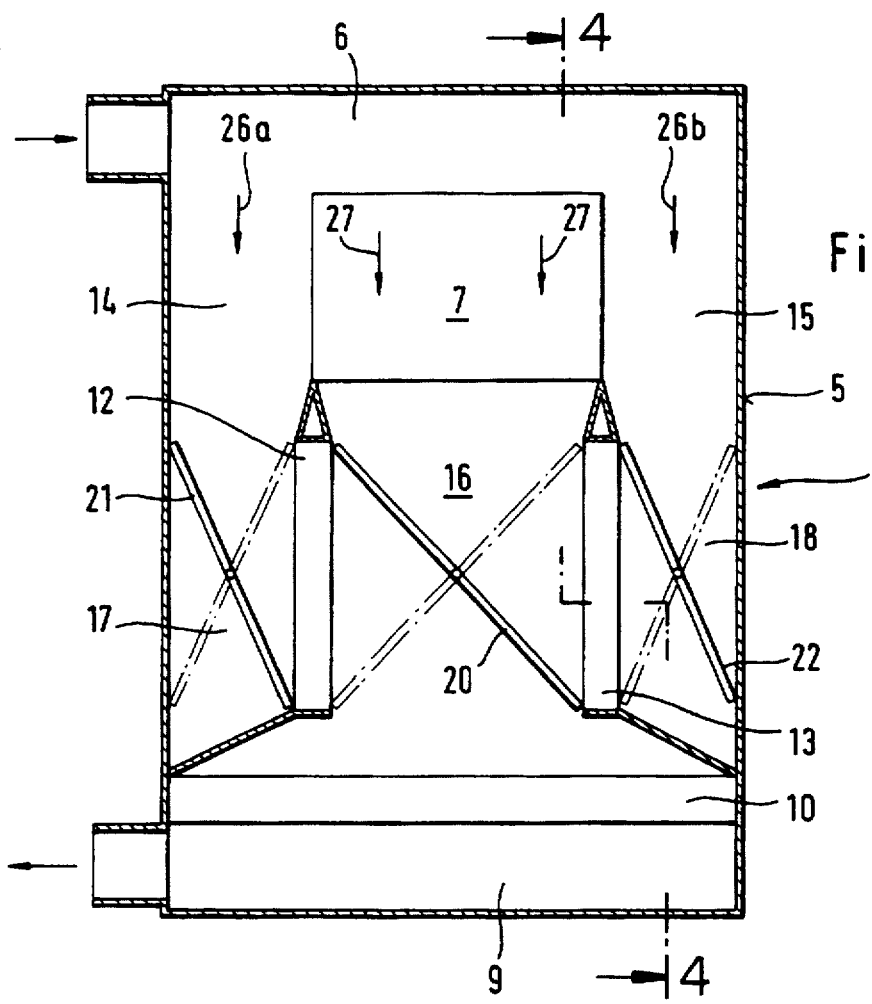
FIG. 3 shows a cross-section taken along line 3—3 of FIG. 2.

In the air drying device 4, as shown in FIGS. 2 and 3, for drying air fed to the vehicle interior 1, the reactor means 8 comprises two reactors 12, 13, each having an adsorbent, arranged in the housing 5 and aligned in parallel to one another. A common main air chamber 16 is formed between the reactors 12, 13. A secondary air chamber 17 or 18 is formed between the housing 5 and each of the reactors 12, 13. Each of the two secondary air chambers 17, 18 extends parallel to the longitudinal direction of the reactors 12, 13. Each reactor 12, 13 forms an air-permeable adsorbent wall between the secondary air chambers 17, 18 and the main air chamber 16. The main air chamber 16 and the secondary air chambers 17, 18 are open at their ends facing the inlet chamber 6, the heat exchanger 7 being provided upstream of the inlet of the main air chamber 16.

The heat exchanger 7 is preferably designed as a counterflow heat exchanger and comprises a plurality of parallel plates, between which corrugated ribs are arranged and connected to the plates by bonding, the space therebetween forming the exhaust air passageway for the exhaust air (desorption air) to be released to the ambient. Since the main air chamber 16 is positioned in the center of the housing 5, the heat exchanger 7 is also located in the center, with the air duct 14, 15 leading to the secondary air chambers 17, 18 formed on each side of the heat exchanger.

In each secondary air chamber 17, 18 and the main air chamber 16, an air-flow control element 20, 21, 22, such as a flap, extends diagonally in the respective chamber 16, 17, 18 and can be pivoted around a pivot axis in the center of the flap. This allows the air-flow control elements to be switched over between the two end positions (first and second) determined by the diagonals of the air chambers, 16, 17, 18. All of the air-flow control elements 20, 21, 22 are actuated simultaneously, preferably by a common drive 31. The air-flow control flap 20 in the main air chamber 16 divides the latter, in each of the two possible positions, into a front or upstream region and a rear or downstream region. Adjoining the rear region of the main air chamber 16 is the outlet chamber 9 where the activated carbon filter 10 extends transversely with respect to the air flow direction over the entire width of the outlet chamber.

As can be seen in FIG. 2, the air duct 11 is arranged in a housing projection 19, i.e., the air duct 11 is formed by an intermediate floor or wall 23 and the housing projection extending from that end of the reactors on the outlet chamber side as far as that end of the heat exchanger 7, which is on the inlet chamber side. In the region of the secondary air chambers 17, 18, openings 24, 25 are provided in the intermediate wall 23, which openings are located at the ends of the secondary air chambers 17, 18 remote from the inlet chamber 6. Thus, the secondary air chambers 17, 18 can be connected to the air duct 11. The openings 24, 25 are closeable depending on the position of the air-flow control elements 21, 22, one of the openings always being blocked from communicating with the inlet air (adsorption) therethrough with the air duct 11 and the other opening communicating with the inlet air (desorption) with the air duct 11.

The inlet air entering the inlet chamber 6 of the housing 5 is divided into an adsorption air (to be dehumidified) flow 26a, 26b and a desorption air (for drying the reactor) flow 27. The desorption air flow 27 flows first through the heat exchanger 7 and enters the main air chamber 16. According to FIG. 3, owing to the position of the air-flow control elements 20, 21 and 22, the adsorption air flow 26a is guided through the reactor 12 and dehumidified there and then exits from the reactor 12 into the rear or downstream region of the main air chamber 16. After flowing through the activated carbon filter 10, the dehumidified and purified air is fed to the vehicle interior 1.

The desorption air flow 27 enters the front region of the main air chamber 16 from the heat exchanger 7 and, owing to the position of the air-flow control element 20, is guided through the reactor 13 where desorption air carries away (dries) the moisture stored in the adsorbent material. The desorption air flow 27 leaving the reactor 13 passes through the opening 25 located in the intermediate wall 23 of the secondary air chamber 18 into the air duct 11 through which an exhausting air flow 28 is fed to the heat exchanger 7, which provides a passageway for guiding the desorption air flow therethrough. In the heat exchanger 7, the exhaust air flow 28, which is loaded with moisture, releases its heat to heat the inlet air (desorption air flow) 27 flowing from the inlet chamber 6 through the heat exchanger 7 into the main air chamber 16. This raises the temperature level of the desorption air flow 27. The exhausting air flow 28 is released to the ambient air through an outlet nozzle 29.

If the air-flow control elements 20, 21, 22 are brought into the second possible position, as is illustrated in FIG. 3 by broken lines, owing to the position of the air-flow control elements 20, 21, 22, the reactor 13 serves for dehumidifying the adsorption air flow 26b passing from the secondary air chamber 18 into the rear or downstream region of the main air chamber 16 and from there feeds to the vehicle interior 1 the dehumidified and air purified (by the activated carbon filter 10). At the same time, the desorption air flow 27 passes through the reactor 12 into the secondary air chamber 17 and passes through the opening 24 in the intermediate wall 23 into the air duct 11 from which it is fed to the heat exchanger 7.

Figure 4:
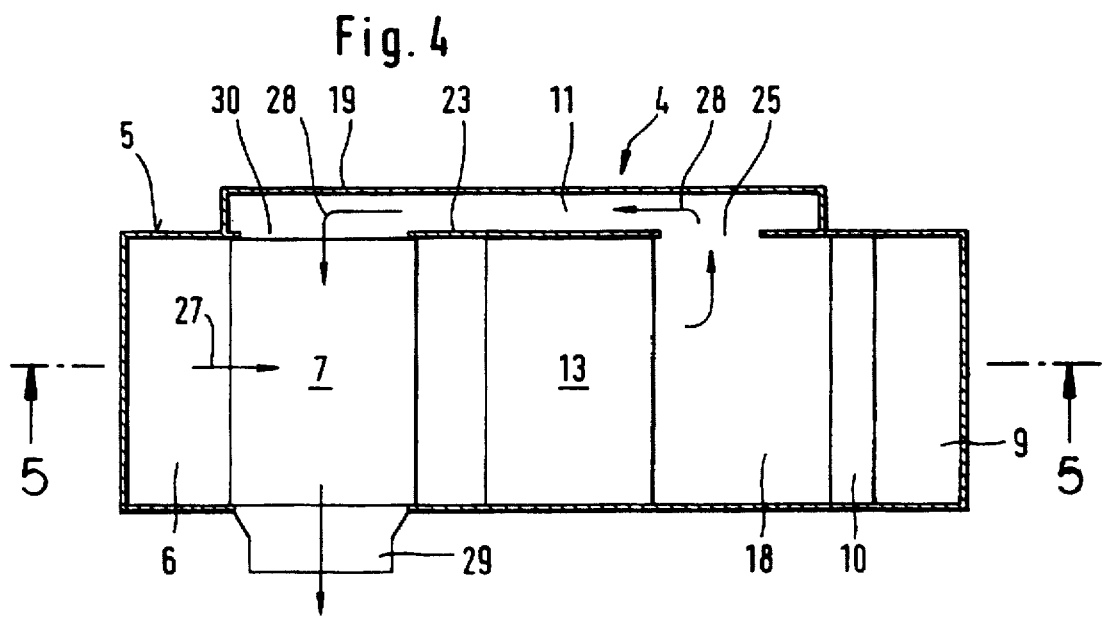
FIG. 4 shows a cross-section taken along line 4—4 of FIG. 3.

FIG. 4 shows a section along line 4—4 of FIG. 3. For parts that are identical, the same reference numerals correspond to those of the previously described figures. It is clear from this illustration that the desorption air flow 27 is fed from the inlet chamber through the heat exchanger 7 to the reactor 12 and passes on the outgoing flow side of the reactor through the opening 25 in the intermediate wall 23 into the air duct 11. In this arrangement, the air duct 11 is of flat design and is bounded by the housing projection 19 and the intermediate wall 23 and it extends from the front end of the heat exchanger 7 as far as the remotely located end of the secondary air chamber 18. The outgoing or exhausting air flow 28, which is guided in the air duct 11, enters on the upper side through an opening 30 in the intermediate wall 23 into the heat exchanger 7 and is guided through the outlet nozzle 29 on that end of the heat exchanger 7, which is on the outgoing flow side to the outside of the vehicle and hence into the ambient air.

Figure 5:
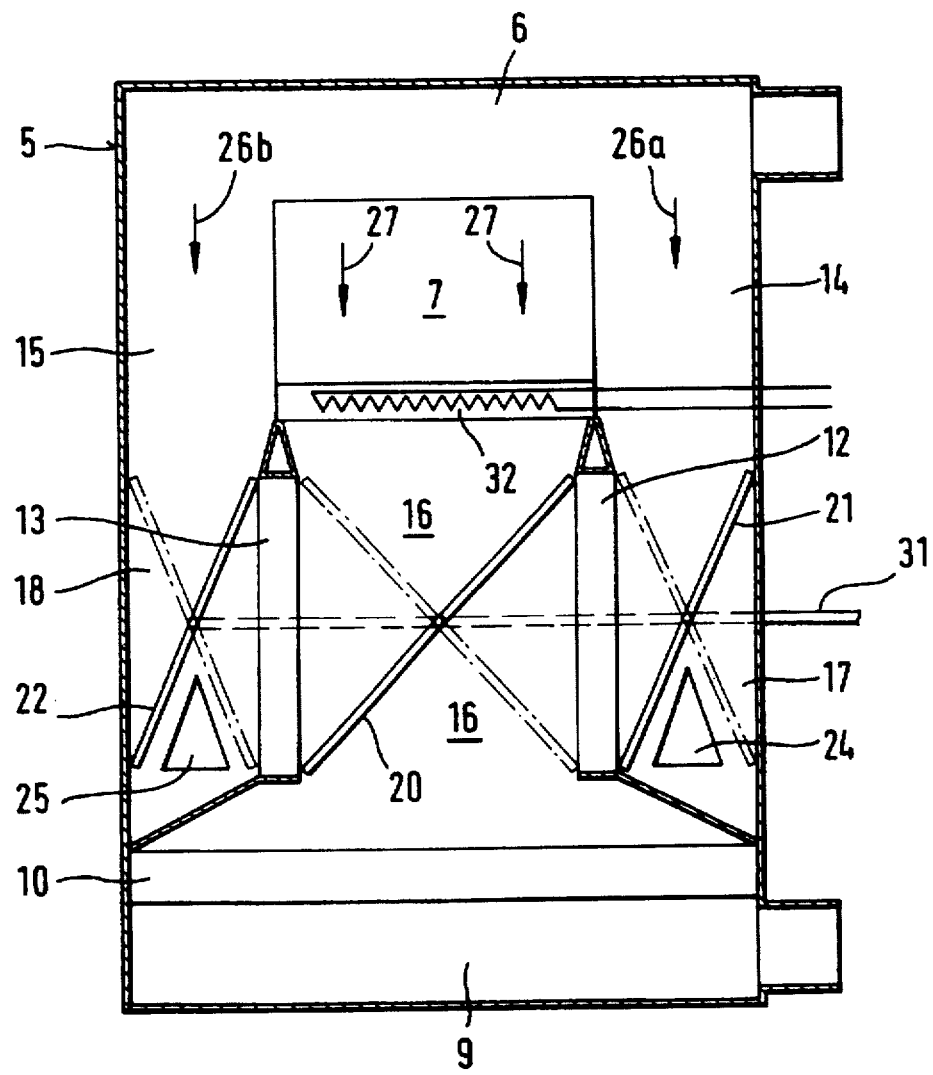
FIG. 5 shows a cross-section taken along line 5—5 of FIG. 4.

FIG. 5 shows a section along the line 5—5 of FIG. 4. This illustration clarifies the arrangement of the openings 24, 25 in the end-side region of the secondary air chambers 17, 18 as well as the interaction with the air-flow control flaps 21, 22. A common drive for actuating the air-flow control flaps 20 to 22 is diagrammatically illustrated by the reference numeral 31. Additionally to the previously described design, the arrangement according to FIG. 5 has a further heating device 32 arranged downstream of the heat exchanger 7 and located directly upstream of the main air chamber 16. The heating device may, for example, be a positive temperature coefficient (PTC) heating installation or a heating unit through which coolant from an engine of the motor vehicle flows. By means of a heating device of this type, the temperature of the desorption air flow 27 can be raised further to obtain a better desorption action in the reactor connected downstream. So that the heating power can be adjusted depending on the particular demands, a temperature sensor for detecting the desorption air flow temperature and a control circuit can be provided.

Figure 6:
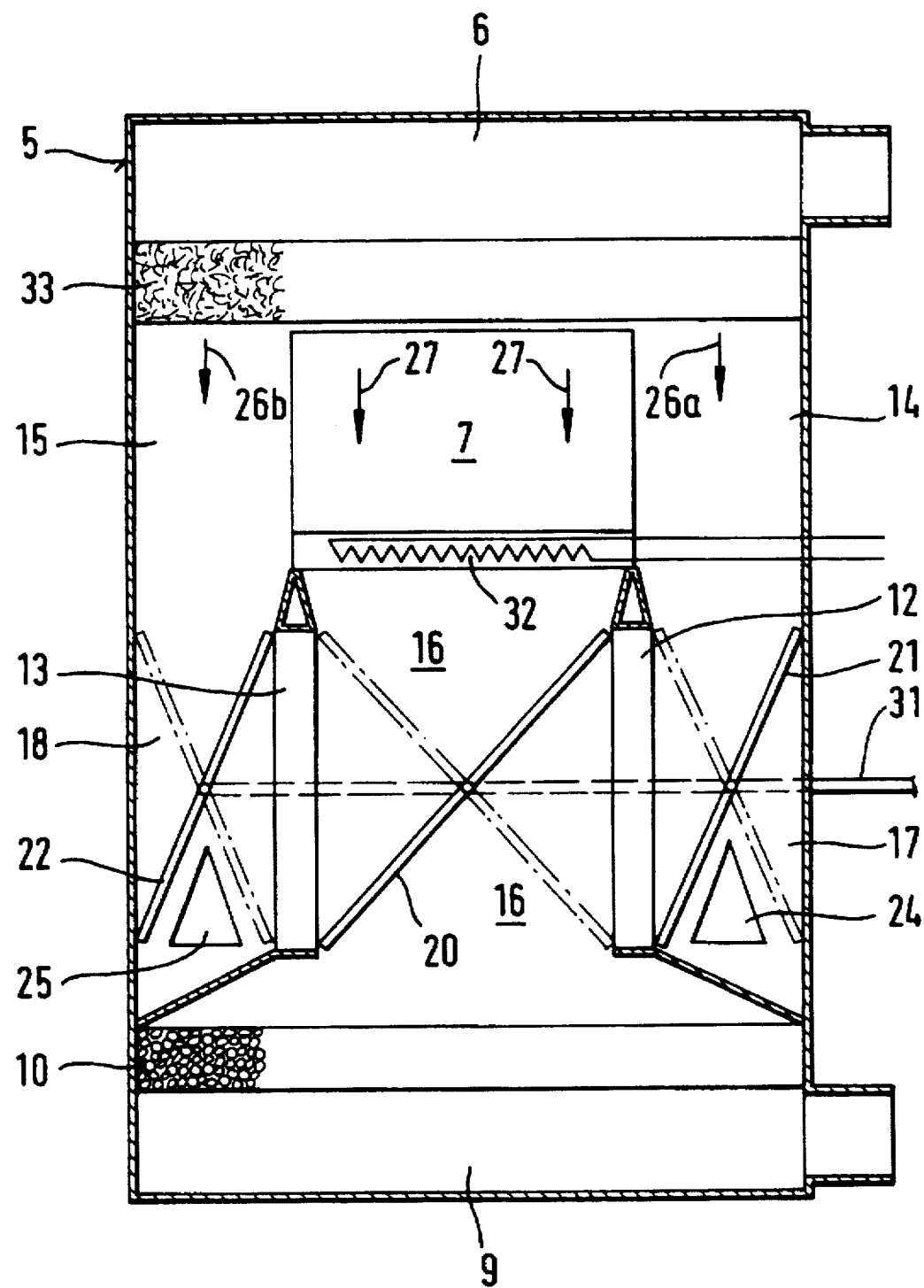
FIG. 6 shows another embodiment similar to FIG. 5.

FIG. 6 shows an embodiment similar to FIG. 5. The identical or similar components have the same reference numerals as the previously described figures. In FIG. 6, a particulate air filter 33 is arranged in the inlet chamber 6 formed in the housing 5. The entire volume of the entering air flow is guided through the particulate air filter 33 and is thus free from all solid constituents above a certain size, regardless whether the inlet air is the adsorption air flow 26a, 26b or the desorption air flow 27. As a result of the filtering out of solid constituents in the particulate air filter 33, the reactors 12, 13 are loaded with particles to a very small degree, freeing the reactor material for adsorption. The particulate air filter 33 is expediently designed as an easily exchangeable insert in the inlet chamber 6.

According to the present invention, the essential advantages are that the heat energy, which is required for drying the reactor (desorption operation), is substantially gained from the exhausting air flow. In a preferred development, the heat exchanger is designed as a counterflow heat exchanger and comprises a plurality of aligned parallel plates with corrugated ribs bonded to the plates. A particularly compact arrangement is achieved using a common main air chamber and two separate secondary air chambers formed in the air guiding housing, with each of the reactors arranged between the main air chamber and one of the secondary air chambers. Air-flow control elements are provided in the main air chamber and the secondary air chambers, by which control elements the reactors can be changed over alternately from adsorption operation (dehumidification of air) to desorption operation (reactor drying), and vice versa. In this arrangement, it is advantageous for the air-flow control elements in the main air chamber and the secondary air chambers to be driven by a common actuating device. The flaps in each case merely take up two end positions corresponding to the respective operating mode of the reactors. The reactor in adsorption operation is connected to an outlet chamber in the air guiding housing, from which chamber the air flow is guided to the vehicle interior. The reactor in desorption operation is connected to an air duct to which the exhausting air is fed to the heat exchanger.

The heat exchanger is preferably arranged transversely with respect to the longitudinal direction of the main air chamber, more preferably directly upstream of the latter, so that air can flow into the main air chamber without changing direction. An inlet chamber is expediently formed in the air guiding housing, from which inlet chamber at least one air duct for the adsorption air flow emerges. In addition, the inlet chamber is adjoined by the heat exchanger through which the desorption air flow exits from the inlet chamber. Since the main air chamber is located between the two secondary air chambers, it is advantageous for the heat exchanger to be arranged centrally between two air ducts leading to the secondary air chambers.

The air duct guiding the desorption air flow on the outgoing flow side of the reactor to the heat exchanger is preferably designed such that it extends along one side of the air guiding housing and is formed by a flat housing projection. An intermediate floor serves as the wall dividing the air duct from the main air chamber and the secondary air chambers, the intermediate floor having a closeable opening in that region of each secondary air chamber on the outgoing flow side, through which opening the desorption air flow can enter the air duct from the secondary air chamber.

Since the temperature of the desorption air flow is possibly inadequate for sufficient rapid desorption, it may be advantageous for a heating device, which may, for example, be a PTC heating installation or a heating unit through which liquid flows, to be arranged in the desorption air flow upstream of the reactor. The liquid used is preferably a water/glycol mixture, in particular in the case of use of the waste heat produced in a drive assembly, such as an engine. In this arrangement, it is particularly expedient to arrange the heating device between the heat exchanger and the main air chamber. So that the heating device is operated in a demand-optimized manner, it is advantageous for a temperature sensor, which detects the desorption air flow temperature, and a control circuit to be provided by means of which the heating power of the heating device can be controlled.

As the adsorption air flow is dehumidified in one of the reactors, some of the pollutants adhering to the moisture is bound to the adsorbent material of the reactor. For optimum use of the adsorption material in the reactors it is advantageous to not load the reactors with dirt particles since they would adversely effect the adsorption capability as the consequence of the deposits covering the surface of the adsorbent. It is therefore advantageous to provide a particulate air filter in the upstream of the reactors in the air guiding housing. To further isolate pollutants from air, it is advantageous to arrange an air filter, preferably an activated carbon filter, in both the inlet and outlet chambers. The particulate air filter is preferably designed such that the filter acts upon the entire air flow. Since a filter of this type is usually not capable of regeneration, the particulate air filter is designed such that it can easily be exchanged, for example, in the form of a filter cassette.

Given the disclosure of the present invention, one versed in the art would appreciate the fact that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. A device adapted for drying air in a passenger compartment of a motor vehicle, comprising:

an air guiding housing defining at least two air flow paths, the air guiding housing having an inlet for receiving inlet air to be dehumidified and an outlet for discharging dehumidified air, wherein the outlet is adapted to communicate with the passenger compartment;

two reactors each having an adsorbent for adsorbing moisture in air, one positioned in each of the two air flow paths;

a heat exchanger upstream of the reactors and adapted to heat the inlet air passing therethrough, the heat exchanger having an air passageway for exhausting air to the ambient;

air-flow control elements for directing air to flow through both the reactors, wherein the flow control elements direct the inlet air through each of the reactors between
an adsorption operation where the flow control elements guide the inlet air to pass through the reactor to dehumidify the inlet air and guide the dehumidified air to the outlet, and
a desorption operation where the flow control elements guide the inlet air to pass through the reactor to dry the reactor and exhaust the air passing through the reactor through the passageway in the heat exchanger and to the ambient, wherein the flow control elements enables one of the reactors to provide the adsorption operation while the other of the reactors provide the desorption operation, and vice-versa, wherein the heat exchanger is adapted to heat the inlet air passing through the heat exchanger by transferring heat from air exhausting through the heat exchanger passageway.

2. The device according to claim 1, wherein the two air flow paths are parallel and are defined by two secondary air chambers.

3. The device according to claim 2, wherein the air guiding housing further includes a common main air chamber separating the two secondary air chambers, the two reactors defining the common main air chamber, wherein each of the secondary air chambers is defined between one of the reactors and a wall of the air guiding housing, and wherein the air-flow control elements are positioned in the main air chamber and each of the secondary air chambers, the air flow control elements being selectively and alternately movable to direct air between a first position where the flow control elements guide the inlet air to pass through one of the reactors to dehumidify the inlet air and guide the dehumidified air to the outlet, and guide the inlet air to pass through the other reactor to dry the other reactor and exhaust air passing therethrough to the passageway in the heat exchanger, and a second position where the flow control elements guide the inlet air to pass through the other reactor to dehumidify the inlet air and guide the dehumidified air to the outlet, and guide the inlet air to pass through the one reactor to dry the one reactor and exhaust air passing therethrough to the passageway in the heat exchanger.

4. The device according to claim 3, wherein the air-flow control elements comprise air-flow control flaps adapted to be pivoted by a common actuating device so that all of the flaps are pivoted simultaneously.

5. The device according to claim 3, wherein the heat exchanger is positioned transversely with respect to a longitudinal direction of the main air chamber and upstream thereof.

6. The device according to 3, wherein the air guiding housing further includes an inlet chamber, the inlet leading to the inlet chamber, at least one air duct being formed in the inlet chamber for passage of the inlet air to be dehumidified, the heat exchanger being positioned in the inlet chamber so that part of the inlet air passing from the inlet chamber passes through the heat exchanger and travels into the main air chamber and through one of the reactors to be dried.

7. The device according to claim 6, wherein the air guiding housing has two air ducts upstream of the inlet chamber and the heat exchanger is positioned centrally between the two air ducts.

8. The device according to claim 6, wherein the air guiding housing includes an outlet chamber downstream of the two air flow paths, the outlet being at the outlet chamber.

9. The device according to claim 8, further including an air filter positioned in the outlet chamber upstream of the air outlet.

10. The device according to claim 1, wherein the heat exchanger comprises a plurality of aligned parallel plates joined together by corrugated ribs bonded to the plates.

11. The device according to claim 1, further including a flat housing projection extending along one side of the air guiding housing, the flat housing projection and the air guiding housing forming an exhaust air duct for exhausting air passing through the reactor to be dried through the heat exchanger.

12. The device according to claim 11, wherein an intermediate wall separates the exhaust air duct from the main air chamber and the secondary air chambers, and openings are provided in the intermediate wall, the air-flow control elements alternately blocking one of the openings to bypass air to the outlet and guiding one of the openings to permit air to exhaust therethrough.

13. The device according to claim 1, further including a heating device upstream of the reactors.

14. The device according to claim 13, wherein the heating device is adapted to pass an engine coolant and the heating device is positioned between the heat exchanger and the main air chamber.

15. The device according to claim 14, further including a temperature sensor for detecting the temperature of the inlet air passing through the reactor being dried and a control circuit for controlling the heating power of the heating device.

16. The device according to claim 1, further including a fan adapted to communicate the inlet with the passenger compartment using air ducts.

17. The device according to claim 16, wherein the fan is adapted to intake ambient air.

18. The device according to claim 1, further comprising at least one particulate air filter in the air guiding housing, upstream of the reactors.

19. The device according to claim 18, wherein the particulate air filter filters the entire volume of the air flow entering the air guiding housing through the inlet.

20. A device for dehumidifying air comprising:
an air guiding housing defining at least two air flow paths, the air guiding housing having an inlet for receiving inlet air to be dehumidified and an outlet for discharging dehumidified air;

first and second reactors each having an adsorbent for adsorbing moisture in air, one positioned in each of the two air flow paths;

a heat exchanger upstream of the reactors and adapted to heat the inlet air passing therethrough, the heat exchanger having an air passageway for exhausting air to the ambient;

air-flow control elements for directing the inlet air to flow through both the reactors, wherein the flow control elements alternately direct the inlet air through each of the first and second reactors between a first position and a second position, wherein in the first position, the flow control elements guide the inlet air to pass through the first reactor to dehumidify the inlet air and guide the dehumidified air to the outlet, and guide the inlet air to pass through the second reactor to dry the second reactor and exhaust air passing therethrough to the passageway in the heat exchanger, wherein in the second position, the flow control elements guide the inlet air to pass through the second reactor to dehumidify the inlet air and guide the dehumidified air to the outlet, and guide the inlet air to pass through the first reactor to dry the first reactor and exhaust air passing therethrough to the passageway in the heat exchanger, wherein the heat exchanger is adapted to heat the inlet air passing through the heat exchanger by transferring heat from air passing through the heat exchanger passageway.

* * * * *